July 21, 1953

L. E. AUSTIN 2,646,091

POWER SCREW DRIVER

Filed Dec. 14, 1948

INVENTOR.
Leonard E. Austin
BY
Moore, Olson & Trexler
Attys.

July 21, 1953

L. E. AUSTIN 2,646,091

POWER SCREW DRIVER

Filed Dec. 14, 1948

INVENTOR.
Leonard E. Austin
BY Moore, Olson & Trexler
attys.

Patented July 21, 1953

2,646,091

UNITED STATES PATENT OFFICE 2,646,091

POWER SCREW DRIVER

Leonard E. Austin, Santa Monica, Calif., assignor to Illinois Tool Works, Chicago, Ill., a corporation of Illinois Application December 14, 1948, Serial No. 65,277

22 Claims. (Cl. 144—32)

This invention relates to a power screw driver, and more particularly to a hopper fed power screw driver.

Hopper fed power screw drivers with which applicant is familiar have not been entirely satisfactory for a number of reasons, chief among which are the frequency of failure of the screw feeding means to deliver a screw properly oriented to the screw driver; the frequent release of a screw from the impositive holding means of the screw driver; the marring of the screws by a continuously rotating driver blade of the type which engages the slots in the heads of the screws; the failure to supply sufficient torque or rotational force to screws by a driver blade of the socket type which only frictionally engages the heads of the screws; the restricted capacity of the machine for handling screws of different shapes and sizes; the difficulty and in some instances the impossibility of adjusting the machine to handle different shapes and sizes of screws; the difficulties of interchanging different sizes of driver blades and screw receivers to adapt the machines for the handling of different sizes and shapes or types of screws; and the difficulties of clearing either the screw feeding means or the screw driver means of jammed screws or screws of abnormal dimensions or shapes which interfere with the proper functioning of the machine.

The primary object of this invention is accordingly to provide a power screw driver, and particularly a hopper fed power screw driver, which will avoid the difficulties and overcome the insufficiencies of prior power screw drivers.

A further object of the invention is to provide a power screw driver, and more particularly a hopper fed power screw driver, which may embody or utilize a standard drill press.

The present invention contemplates the provision of a screw feeding unit including a hopper and screw feeding control means, and a rotary and reciprocating screw driver unit of such construction as to be attachable to a standard drill press to convert such standard drill press into a hopper fed power screw driver.

Other objects of the invention are to provide in a power screw driver positively acting holding means receiving and carrying screws to threaded work pieces or nuts with which they are to be assembled; to provide readily operable means for ejecting screws jammed in a screw feeding means or in a screw driver mechanism of a power screw driver; to provide in a power screw driver readily operable means for adjusting the driving mechanism for the handling of different sizes of screws; to provide in a power screw driver readily interchangeable screw receiving and driving parts to facilitate setting up of the power screw driver to handle the different sizes and shapes of screws; to provide in a power screw driver, of the type utilizing a driver blade engaging the slots in the heads of the screws, driving means impositively rotating the driver blade during the slot finding movement of the blade relative to the screw so as not to mar the screw head, and positively rotating the screw as it is brought into engagement with the threaded aperture in the work piece or nut with which the screw is to be assembled; to provide in a power screw driver improved fluid actuating means, preferably pneumatic, for rectilinearly reciprocating the screw driving mechanism between a screw receiving position and a screw driving position; to provide in a power screw driver improved screw carrier means comprising a one-piece resilient catcher normally self-urged to screw releasing position and controlled by the means by which it is guided and through which it moves so that the catcher assumes, in its different positions of movement, a partially closed position for receiving a screw, a fully closed position in which it aligns and centralizes the screw with the threaded work aperture and an open position in which it releases the screw; to provide in a power screw driver having an axially shiftable and rotatable screw driver and an axially shiftable screw receiver or catcher, the combination of power actuated means for axially shifting the screw driver through a predetermined, readily adjustable length of travel, and means for automatically connecting and disconnecting said power actuated means to said screw receiver or catcher for axially shifting said receiver or catcher during a predetermined adjustable portion only of the axial movement of the screw driver; to provide in a power screw driver having an axially shiftable and rotatable screw driver and an axially shiftable screw receiver or catcher cooperating therewith, the combination of power actuated means for rotating the screw driver, means for shifting the screw driver and screw receiver axially, and means forming an impositive or frictional rotary drive connection between the power actuated means and the screw driver as the screw driver first engages the work piece and responsive to the engagement of the screw by the screw driver to form a positive driving connection between the power actuated means and the screw driver.

Other and further objects and advantages of the invention will be apparent from the following description when taken in connection with the accompanying drawings wherein.

As shown in the drawings, a power screw driver which forms one embodiment of the present invention, comprises a standard drill press 2 of the socket type to which is attached a plurality of additional and substitute or auxiliary mechanisms by which said drill press may be adapted for use as a hopper fed, power screw driver. The standard type of drill press 2 comprises a main base or stand 4, Fig. 1, on which is mounted a hollow supporting column or post 6 carrying at its upper end a vertically adjustable head unit 8 and intermediately of its length a vertically adjustable work table 10. The work table 10 is carried by the usual vertically slidable collar 12 clamped in adjustable position by the usual clamping means operated by hand lever 14. The head unit 8 includes the usual mounting frame 16 formed with a vertically slidable collar 18 clamped in adjusted position by the usual lever operating means, not shown.

The frame 16 is also formed on opposite sides of the collar 18 with bosses 20, one only of which is shown in the drawing, receiving adjustable mounting rods, not shown, for the motor mounting plate 22 to which is bolted on its rear face the usual drive motor 24, the shaft of which projects upwardly and carries at its upper end a four step pulley 26 driving a belt 28 which passes over a four step pulley 30 driving in the usual manner the multi-splined spindle 32.

The spindle 32 is journaled in the usual manner in the tubular front section 34 of the head frame 16, as by a sleeve 36 fitted in roller bearings 38 at the upper end of the tubular frame section 34. The spindle is also journaled in the vertically reciprocable quill or tube 40 as by roller bearings 42 and 44 at the upper and lower ends of the quill. The bearing 42 is held in place by the usual ring nut 46 and a collar 48 pinned to the spindle above the bearing 42 prevents relative axial movement between the spindle and the quill in a downward direction.

The quill or tube 40 is slidably mounted in the tubular frame section 34 in the usual manner as by axially spaced annular shoulders formed on the inner surface of the tubular frame section 34.

Figures 1, 2:
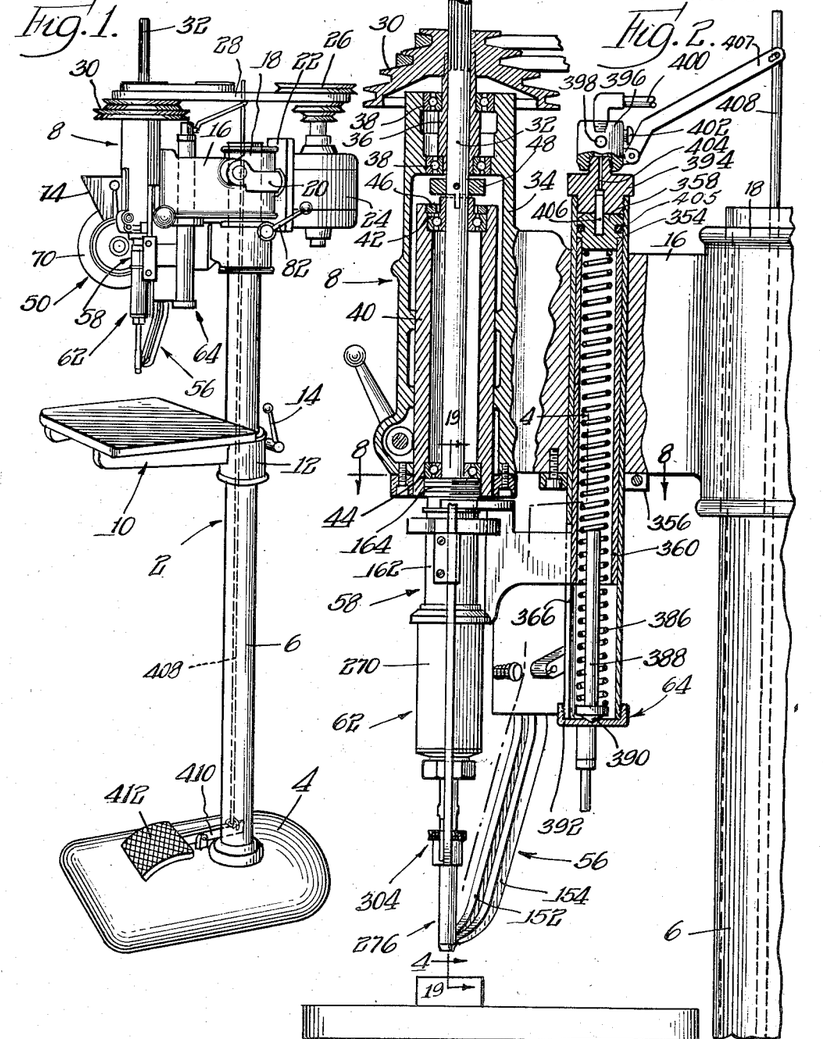
Fig. 1 is a view in perspective of a power screw driver embodying the invention.
Fig. 2 is an enlarged, fragmentary view in substantially vertical section taken along the line 2—2 of Fig. 3.
Figure 3:
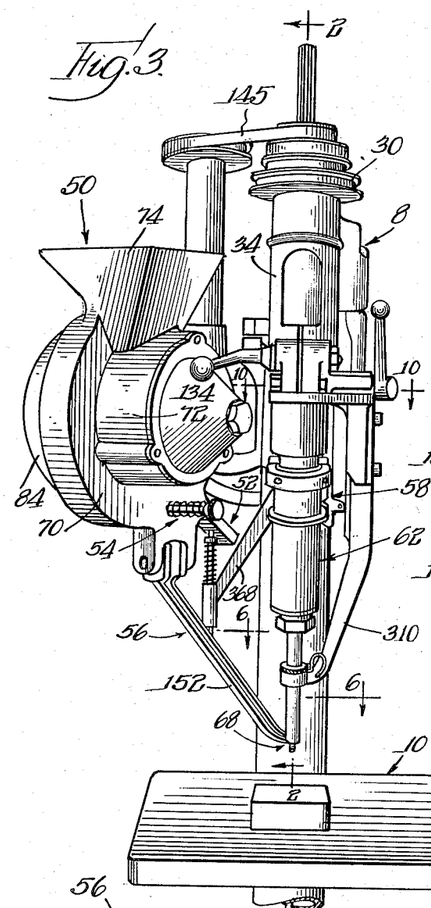
Fig. 3 is a fragmentary view in perspective of the power screw driver of Fig. 1.
Figure 4:
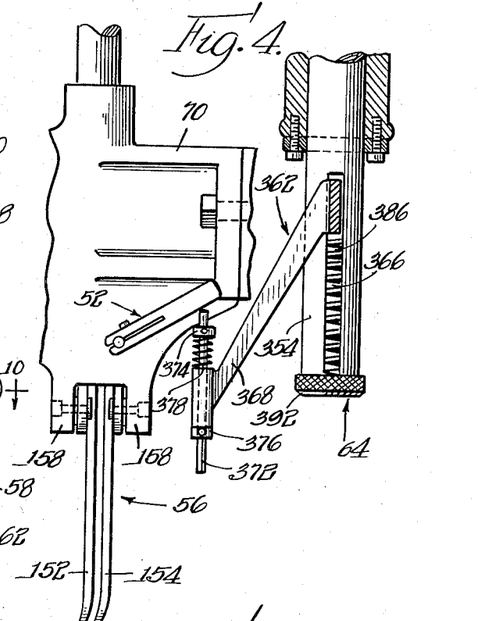
Fig. 4 is a fragmentary view in vertical section taken substantially along the line 4—4 of Fig. 2.
Figure 5:
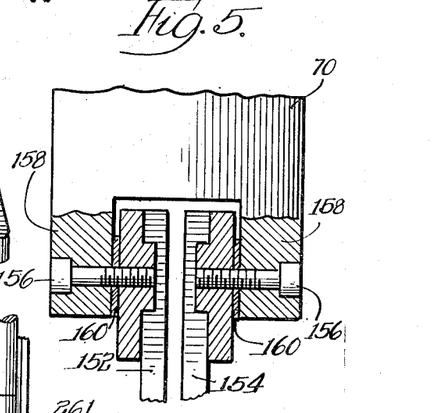
Fig. 5 is a fragmentary enlarged view in vertical section taken substantially along the line 5—5 of Fig. 13.

The additional and substitute or auxiliary mechanism or means comprise screw feeding means including a screw feeding hopper 50, Figs. 1, 3, 8, 13 and 14; an escapement or screw feeding control device 52, Figs. 3, 4, 13, 15 and 16; a manually operable screw releasing means or device 54, Figs. 4, 14, 15 and 17, and a screw feeding chute 56, Figs. 1 to 7, 13 and 14; a vertically reciprocable and rotatable screw driving means or unit 58, Figs. 1 to 3, and 18 to 24; a rotary drive unit 60, Figs. 18 to 23, connecting the spindle of the drill press to the screw driving means or unit 58; vertically reciprocable screw receiving or carrying means 62, Figs. 1 to 3, 6, 7, 9, 11, 12 and 19 to 21; manually or pedally operated or controlled actuating means 64, Figs. 1 and 2, causing vertical reciprocation of the screw driving means or unit; and automatically operable means 66, Figs. 3 and 18 to 23, for connecting the screw driving means or unit to, and for disconnecting it from, the vertically reciprocable screw receiving or carrying means to cause reciprocation of the screw receiving or carrying means during a portion of the reciprocation of the screw driving means or unit.

*Screw feeding means*

As previously described, this screw feeding means comprises a screw hopper 50, a control device or escapement 52, the screw releasing means 54, and the screw feeding chute 56.

The screw hopper comprises a main body casting 70 having a drum portion 72 projecting from one side of the casting and a screw receiving funnel 74 having an inclined rear wall and opening through the front wall of the casting opposite the drum portion 72. The main body casting is also formed with a laterally extending bracket portion 76, Fig. 8, secured as by bolt 78 to the side arm of a collar 80 slidably mounted on the drill press column 6 and secured in adjusted position by any desired form of manually operable collar clamp 82, Fig. 1.

A tumbler drum 84 is mounted in juxtaposition to the outer face of the main hopper casting 70 in position to receive internally thereof screws from the lower open bottom of the hopper funnel 74. This drum 84 is bolted at its outer end to a drive disk 86 keyed to a drive shaft 88, best seen in Fig. 13. The main hopper casting 70 is formed with a projecting boss 90 supporting bearings 92 in which the shaft 88 is journaled, the shaft having an annular shoulder seating against the inner bearing 92 to prevent endwise movement of the shaft in one direction, and the shaft projects through the drive disk 86 and is threaded at its outer end for reception of the clamping nut 94. The drum 84 is provided with a plurality of angularly spaced axially extending slots 96 of a cross dimension sufficiently greater than the diameter of the shanks of the screws to permit ready passage of the screws therethrough radially of the drum but sufficiently small in such cross dimension to prevent passage of the heads of the screws therethrough.

The drum at its inner end is spaced from the outer face or surface 98 of the main body casting 70 a distance comparable to the height of the heads of the screws so that screws which are lying with their heads proximate the surface 98 and their shanks extending axially of the drum will pass through the slots 96 with their heads passing radially between the inner edge of the drum and the surface 98 of the hopper casting 70.

Figures 13, 14, 15, 16, 17:
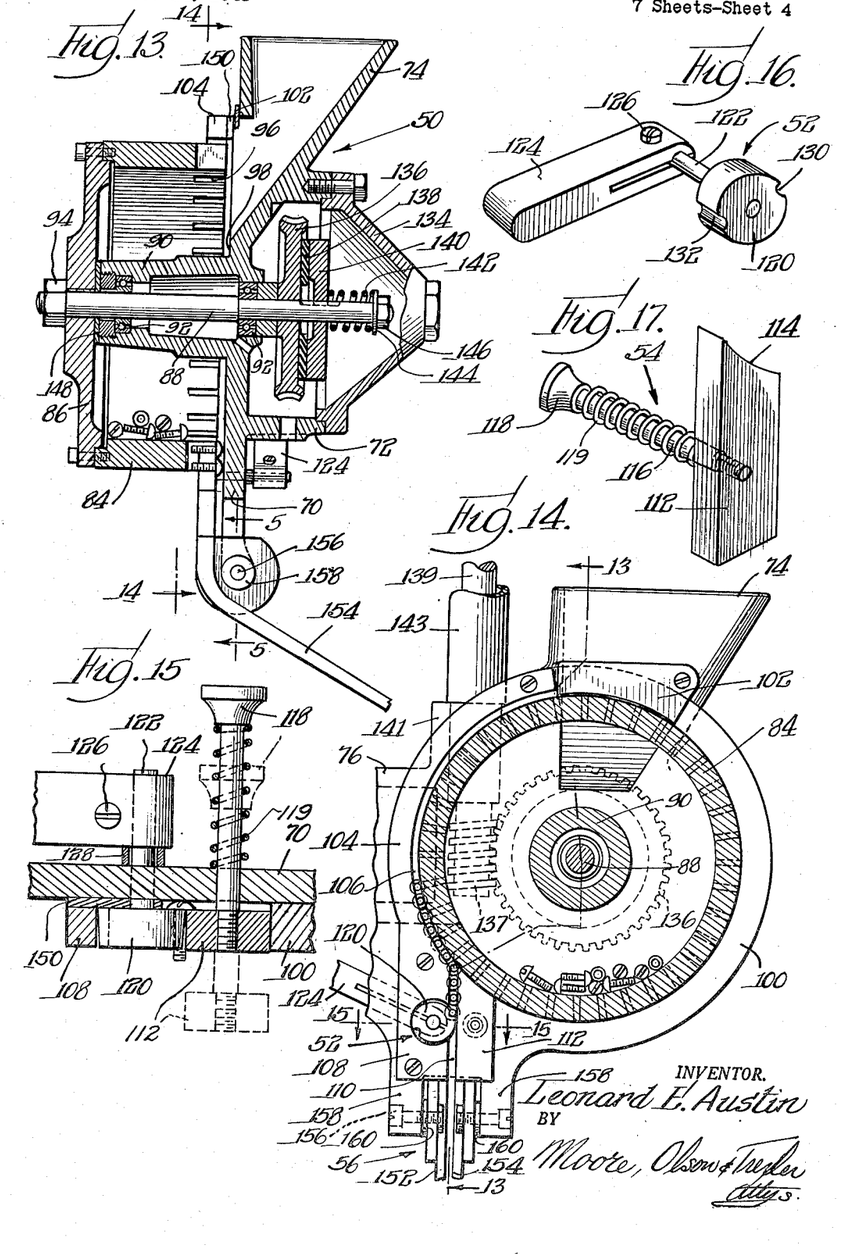
Fig. 13 is a fragmentary view in vertical section taken substantially along the line 13—13 of Fig. 14.
Fig. 14 is a fragmentary view in vertical section taken substantially along the line 14—14 of Fig. 13.
Fig. 15 is a fragmentary view in horizontal section taken substantially along the line 15—15 of Fig. 14.
Fig. 16 is a view in perspective of a screw feed control escapement mechanism.
Fig. 17 is a view in perspective of a manually operable screw release mechanism.

A retaining ring or flange 100 secured to or formed integrally with the main body casting extends about the right side of the drum 84, as seen in Fig. 14, in close juxtaposition to the drum so that screws in the bottom part of the drum cannot pass therefrom.

An arcuate closure plate or strip 102 bolted to the main hopper casting extends over a portion of the drum at the top thereof to close the space between the bottom edge of the front wall of the hopper funnel 74 and the rotating drum 84 to prevent the screws dumped into the funnel from jumping out of the hopper over the rotating drum. A retaining ring 104 is bolted to the main hopper casting and extends about the left side of the drum, as seen in Fig. 14, in radially spaced relation thereto, so as to form a gravity feed chute 106 for receiving the screws which pass through the slots 96 of the drum. A block 108, Figs. 14 and 15, which may be integral with the ring 104, forms one side of a vertically extending gravity feed chute 110, the other side of which is formed by a block 112 forming part of the screw releasing means 54, Fig. 17.

The block 112 is formed at its upper end, as best seen in Figs. 14 and 17, with a part circular edge 114 which lies in close juxtaposition to the periphery of the drum 84 and projects slightly above the upper edge of the block 108 so as to engage the shank of a screw advancing down the curved chute 106 and direct it into the vertical chute 110. The block 112 is threaded on the outer end of a manually operable push pin or slide rod 116 slidably mounted in a suitable aperture in the main body casting 70. The push pin is provided with an enlarged head 118 and a coil spring 119 is interposed between one face of the main body casting and the head 118 so as to urge the block 112 to the closed position shown in full lines in Fig. 15. It will be evident that on depression of the push pin 118 to the dotted line position shown in Fig. 15 the block 112 will be moved to open position so that a screw jammed in the chute 106 or the chute 110 may be dropped or quickly removed therefrom.

The control device or escapement 52 preferably comprises a disk 120 fixed in any suitable manner to a pin 122 journaled in a suitable aperture in the main body casting 70, the disk 120 being received in a part circular opening or recess in the block 108. The operating lever or bar 124 is mounted on the outer end of the pin 122 and suitably secured thereto in a manner permitting angular adjustment of the bar relative to the pin. As shown in Figs. 15 and 16, this operating lever may be bifurcated to provide spaced arms receiving between them the pin 122 and the arms may be clamped to the pin by a clamping screw 126.

A spacing collar 128, Fig. 15, interposed between the bar 124 and the hopper casting prevents axial movement of the pin in one direction while the disk 120 prevents movement of the pin in the opposite direction. It should be noted that the disk 120 is formed with one pair of axially extending notches 130 and 132 to receive the shanks of one size of screw when the disk is positioned as shown in Fig. 15 and another size of screw when in a position at 180 degrees to that position. The notches 130 and 132 are of different sizes, and also different shapes when desirable, to handle different sizes of screws by simply loosening the clamping screw 126 and rotating the pin 122 relative to the lever bar 124 to an angle of 180 degrees.

It has been found that better control of the feeding of the screws down the vertical chute 110, with less likelihood of jamming, may be obtained by providing the disk 120 with an axially tapered periphery, so that the disk is slightly frusto-conical in shape with the end of greatest diameter adjacent the hopper casting, as seen in Fig. 15. The disk does not have a truly circular periphery in any plane transverse to its axis but the periphery is slightly eccentric to the axis of rotation of the disk, as illustrated in Fig. 14. It will be evident, as there shown, that the disk is of greatest radius at the forward edge of each screw receiving notch and of minimum radius at the opposite edge of the notch. It has been found that this difference in height of the opposite walls of the screw receiving notches 130 and 132 is of great benefit in eliminating jamming of the screws as they pass the escapement device.

The hopper drum driving shaft 88 extends from the boss 90 into the drum portion 72 of the hopper casting, which is closed by a cover 134 bolted to said drum portion of the casting. A worm gear 136 is loosely mounted on the shaft 88 and a friction clutch ring 138 is secured thereto. A driving disk 140 is splined to the shaft 88 for rotation therewith and for axial movement relative thereto. A coil spring 142 encircling shaft 88 is interposed between the driving disk 140 and a washer 144 secured thereto by a nut 146 threaded on the end of the shaft. It will be evident that coil spring 142 maintains the driving disk 140 in driving engagement with the friction clutch ring 138, which rotates with the worm gear 136, but said spring permits outward axial movement of the driving disk 140 to disconnect the shaft from the worm gear if the hopper drum becomes jammed. It should be noted that since the hopper drum extends outside or away from the main hopper casting it can readily be manually rotated reversely, or slippage of the clutch, to break the jam.

The worm gear 136 is driven by a worm 137 (Fig. 14) on the lower end of a vertical shaft 139 journaled in a boss 141 of the bracket 76 and housing in a mounting tube 143, the shaft 139 being driven by a belt 145 (Fig. 3) extending from the upper step of the pulley 30 to a pulley 147 on the upper end of the shaft 139 and journaled in tube 143.

Although the hopper drum 84 may be used for feeding screws within a rather wide range of sizes, from time to time adjustment may be necessary in order to enable it to handle screws outside that rather wide range. For that purpose one or more washer-like shims 148 may be inserted between the disk 86 and the outer end of the boss 90 of the main hopper casting and an arcuate shim 150 inserted between the retaining ring or sector 104 and the hopper casting 70 to accommodate screws of different shank lengths and head thicknesses.

The screws can only pass out of the slots of the drum in a limited arc lying below a horizontal plane through the axis of the drum and above the upper edge of the releasable side block 112 of the chute 110. There is, therefore, at any time only a relatively small number of screws in the limited arc and in the relatively short length of the vertical chute above the escapement device 52, as shown in Fig. 14.

Prior hopper arrangements with which applicant is familiar have used long screw delivery tracks filled with screws and that long line of screws remains substantially quiescent in the chute, proceeding down the chute at a very slow rate. The number of screws in the limited feeding arc of the chute 106 and in the section of the vertical chute 110 above the escapement device is small enough so that all of the screws resting therein are constantly agitated by the continuous rotation of the hopper drum and therefore jamming of the screws as they are fed is greatly lessened or eliminated.

From the vertical chute 110 the screws are fed individually, under the control of the escapement device 52, to the chute 56. This chute preferably comprises a pair of finger-like bars 152 and 154 secured as by bolts 156 to spaced lugs 158 depending from the main hopper casting 70. Washer-like shims 160 may be inserted between the mounting plate portions of the bars 152 and 154 and the inner faces of the lugs 158 to predetermine the spacing of the bars to permit passage of the shanks of the screws between the bars while the heads thereof ride upon the bars.

*The screw driving means and drive unit*

The vertically reciprocable and rotatable screw driving means or unit 58 comprises a tube or sleeve or mounting member 162 externally threaded at its upper end as at 164, Figs. 2, 9, and 19 to 23, and threaded into the lower end of the quill 40 in place of the usual ring nut for holding the lower roller bearing 44 in position. The tube or sleeve 162 forms a housing for the drive unit 60. The drive unit 60 comprises a spindle or stub shaft 166, the shaft having an enlarged threaded portion 168 intermediate the ends thereof, an annular groove 170 adjacent the lower end thereof and an axial bore 172 opening at the lower end of the shaft. The shaft 166 is formed in its upper portion with flat surface sections 174 for engagement by set screws 176, which fix the shaft to the drill press spindle 32 for rotation therewith when the stub shaft is introduced into the socket in the lower end of the spindle.

Figures 18, 19, 24, 25:
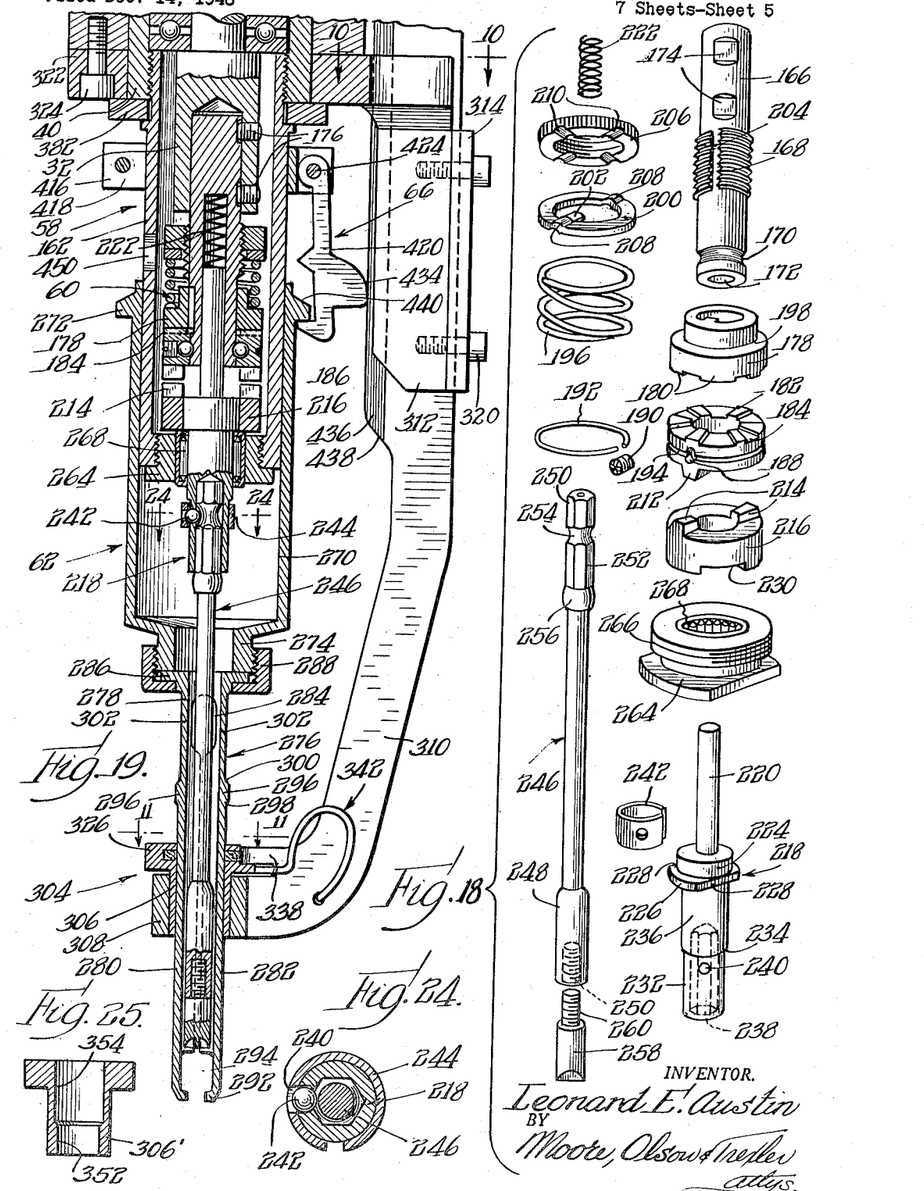
Fig. 18 is an exploded view in perspective of a screw driver and the parts of a double clutch drive unit for the screw driver.
Fig. 19 is a fragmentary enlarged view taken substantially along the line 19—19 of Fig. 2.
Fig. 24 is a view in horizontal section taken substantially along the line 24—24 of Fig. 19.
Fig. 25 is a view in section of a modified form of control element for the screw carrier.

A clutch member or collar 178, Fig. 18, is splined on the stub shaft 166 just below the threaded section 168, as shown in Fig. 19, the clutch member rotating with the stub shaft, but having relative axial movement along the shaft. The clutch member 178 is formed at its lower face with teeth or projections 180 adapted to engage in complementary notches formed by similar teeth 182 formed in a clutch member or collar 184. The clutch member or collar 184 is rotatably mounted on the stub shaft 166 but held against movement axially of the shaft by ball bearings 186 received in the groove 170 at the lower end of the shaft and a like groove in the inner surface of the collar 184, the ball bearings being inserted through a radial opening 188 in the collar 184, and that opening after insertion of the bearings being closed by a set screw 190 threaded into the opening 188 and locked in position by a wire ring 192 received in an annular slot 194 in the collar 184 and in a head slot in the set screw 190.

The clutch member 178 is urged into driving engagement with the clutch member 184 by a coil spring 196 interposed between a shoulder 198 of the clutch member 178 and a ring or washer 200. The retaining ring 200 is formed with an inwardly directed radial key or lug 202 received in a key slot 204 in the threaded section 168 of the stub shaft 166. The ring 200 is adjusted in position and secured against axial movement by a ring nut 206 threaded on the threaded section 168 of the stub shaft. The retaining ring 200 is formed with spaced outwardly extending projections 208 received in complementary notches 210 in the under surface of the ring nut 206. It will be evident that the retaining ring being keyed to the stub shaft and interlocked with the tension adjusting ring nut 206 insures rotation of the clutch spring with the clutch member 178 so that the spring exerts no drag on the rotation of the stub shaft. The retainer ring also acts to hold the adjusting nut in adjusted position. The clutch member 184 in addition to the clutch teeth 182 on its upper surface is provided on its opposite or lower surface with a pair of diametrically opposite V-shaped clutch teeth 212 adapted to cooperate with similar, diametrically opposite clutch teeth 214 formed on the upper surface of a third clutch collar or member 216.

The third clutch member 216 is mounted on a tool receiving chuck or collet 218 which consists of a stub shaft having a reduced upper portion 220 inserted in the axial bore 172 of the stub shaft 166 and of a diameter such as to form a close frictional fit within the bore of that shaft. A coil spring 222 is inserted in the bore 172 of the stub shaft 166 between the bottom of the bore and the upper end of the shaft 220. The tool receiving chuck or collet 218 is also formed with a ring portion or annular flange 224 on which the clutch member 216 is press fitted, the clutch member 216 being keyed to the tool receiver 218 by a flange 226 on the tool receiver, the flange having opposite flat surfaces 228 and the flange being seated in a cross slot 230 in the lower face of the clutch member 216 with the flat faces 228 engaging the flat sides of the slot 230.

In place of the double-clutch between the spindle and the tool receiving collet as above described, any other standard or known double-clutch functioning in a similar manner may be used.

The lower end of the tool receiver is reduced in diameter as at 232, forming a small annular shoulder 234 between that reduced portion and the intermediate larger portion 236. The tool receiver is also formed at its lower portion with a hexagonal bore 238 opening at the lower end of the reduced portion 232, the portion 232 also having a radial opening 240 shaped or countersunk to receive a ball, pin or key 242 resiliently urged into the bore 238 by a spring retaining ring 244 so as to detachably retain a driver bit 246. The driver bit 246 preferably comprises a rod having an enlarged portion 248 at its lower end, and hexagonal portions 250 and 252 at its opposite end spaced axially by an annular groove 254. The rod is also provided with an enlarged portion 256 adjacent but below the hexagonal section 252 and larger than the bore 238 in the tool receiving collet so that by engaging the lower end of the collet it positions the annular groove 254 in the plane of the retaining ball, pin or key 242.

Figures 6, 7:
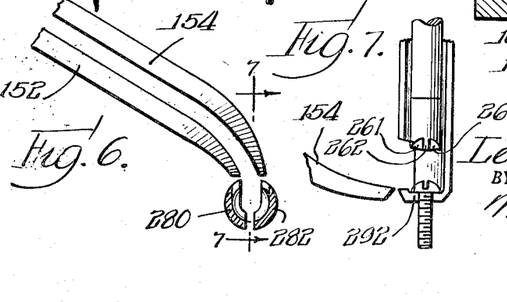
Fig. 6 is a fragmentary enlarged view taken substantially along the line 6—6 of Fig. 3.
Fig. 7 is a fragmentary view in vertical section taken substantially along the line 7—7 of Fig. 6.

The portion 248 of the driver bit is formed with a threaded bore 250 detachably to receive a driver blade 258 having a reduced threaded upper end portion 260 for insertion of the blade in the threaded bore 250. The screw engaging and driving end of the driver blade may take a number of different forms depending upon the head shape of the various screws which it is desired to handle. In general, the screw engaging and driving end of the driver blade is formed, as best seen in Fig. 7, with two concave sections 261 on opposite sides of a diametrically extending, flat sided projection or blade 262 which is adapted to enter the cross slot in the head of the screw. For handling the ordinary round head screws, as shown for illustrative purposes in this application, the convex sections 260 will be defined by wall portions which are part circular in form in a direction parallel to the blade portion 262.

It will be evident that the driver bit blades 258 are readily detachable from and insertable in the shanks of the driver bits so that a single shank may be used with any one of a large variety of bit blades differing in size and in the shape of their screw engaging ends to handle a large variety of types and sizes of screws without requiring any change other than in the bit blade. It will be evident, however, that it may be desirable in a large number of cases to handle screws of types and sizes without that range which can be conveniently handled by insertion of driver bits in a single size bit shank, and therefore the bit shank is itself readily detachable from and insertable in the tool receiving chuck or collet, as previously described.

The sleeve or tube 162 is closed at its lower end by a sleeve nut 264 carrying externally threaded sections 266 provided with a lefthand thread so that it will not be loosened by the rotation of the tool receiving chuck or collar. The sleeve nut 264 is formed internally to receive a needle bearing 268 which forms a bearing for and receives the portion 236 of the tool receiving chuck or collar. The sleeve nut also serves as an abutment limiting the axial movement of the clutch member 216 in a direction away from the clutch member 212. The coil spring 222 and the bore 172 of the stub shaft 166 and the close fit of the portion 220 of the tool receiver in the bore serves as a means for frictionally starting the driving of the tool receiving chuck or collet as the clutch members 184 and 216 moved toward engagement with each other.

*The screw carrying means*

Figures 20, 21:
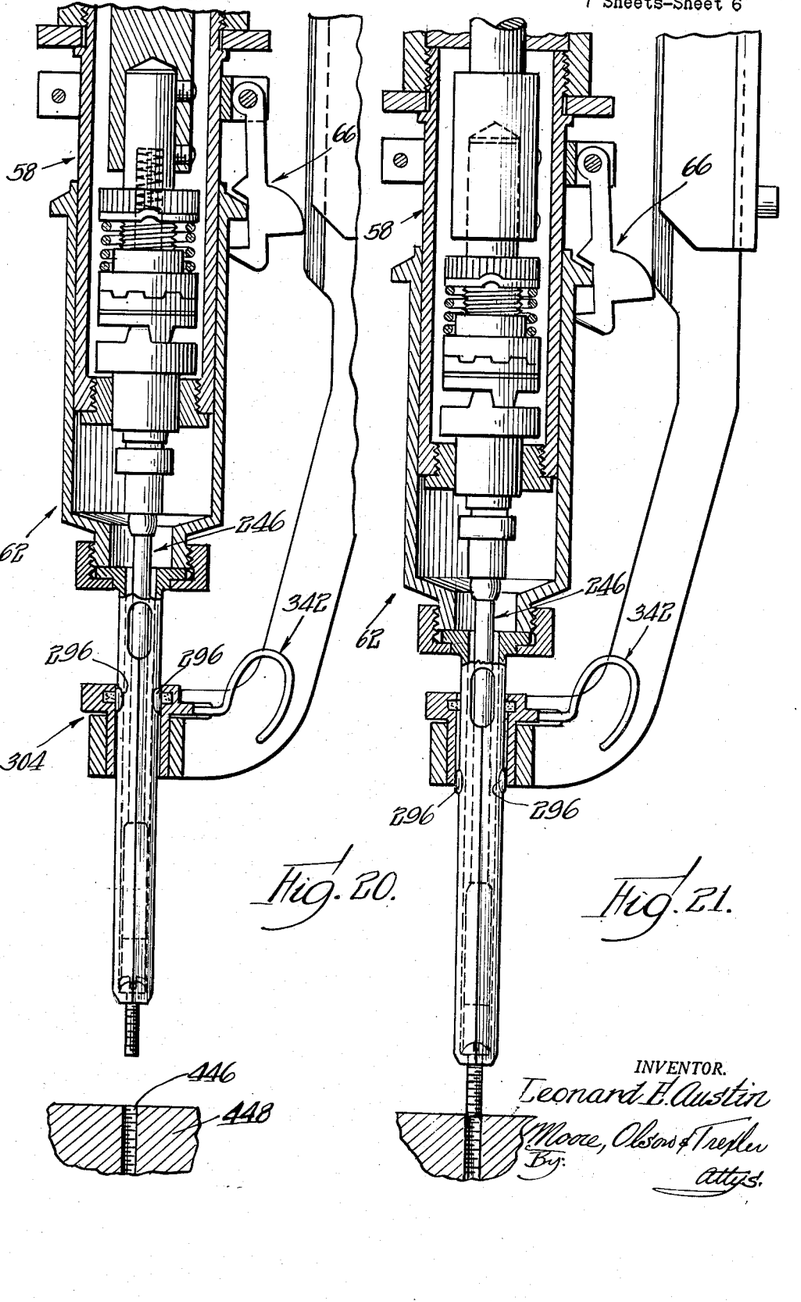
Figs. 20, 21, 22 and 23 are views similar to Fig. 19 but showing the parts in different positions of operation.

The vertically reciprocable screw receiving or carrying means 62 preferably comprises a cylinder 270 having an annular flange 272 adjacent its upper end and a reduced externally threaded lower end 274, the sleeve 270 being slidably mounted on the sleeve or tube 162. A screw receiver and carrier or catcher 276, best seen in Fig. 19, comprises a sleeve having resilient catcher arms 280 and 282 integrally united at the top of the sleeve, the arms being normally spaced by diametrically opposite slots extending from the bottom end of the sleeve to cross openings 284 in the wall of the sleeve adjacent the upper end thereof. At the upper end the sleeve is formed with an annular flange 286 received in a cup-like nut 288 threaded on the portion 274 of the tube 270 in order detachably to mount the screw carrier or catcher on the tube. The catcher arms are formed at their lower ends with confronting slots 290 facing the bottom end of the chute 56 so as to permit the head of a screw moving down the chute to pass from the chute into the space between the catcher arms, the shank of the screw passing between the open catcher arms below the confronting slots 290. The catcher arms are formed at their lower ends with inturned generally semi-circular shelves or lips 292 forming a seat for the heads of the screws. The inner surface of the arms adjacent these shelves or lips 292 are semi-circular in form and preferably tapered axially for a short distance above the shelves or lips and exert a centralizing action on the screw when the catcher arms are brought to closed position, as shown in Fig. 20, thereby aligning the shank of the screw with the axis of rotation of the driver bit. The external surfaces of the catcher arms are semi-circular in form and are preferably tapered or beveled at their lower ends as at 294 for a purpose presently to be described.

The catcher arms are formed with enlarged external cam portions or surfaces 296 which are joined to the surfaces of the arms above and below this cam portion by axially tapered cam surfaces 298 and 300, the sections 302 of the catcher arms above the cam portions 296 being of less external diameter than the cam portions 296 and the sections of the catcher arms below that cam portion, for purposes which will presently appear.

The opening and closing of the screw carrier or catcher 276 is governed by control means 304 which preferably comprises a control sleeve or bushing 306, best seen in Figs. 11, 12, and 19 to 23, detachably mounted in a boss 308 formed at the lower end of a bar 310 and positioned in coaxial alignment with the drill press spindle 32 and concentric to the path of movement of the screw carrier. The bar 310 is slidably mounted for vertical adjustment on a depending arm or bar portion 312, see Fig. 10, of a supporting bracket, the bar being dovetailed with the bracket arm 312 so that the precise vertical alignment of the boss 308 with the spindle is maintained in every position of vertical adjustment of the bar relative to the bracket. The bar is clamped to the bracket in adjusted position by a clamping plate 314 having along one side a flanged edge 316 received in a complementary groove or rabbet in the edge of the bracket arm 312 and an opposite flanged edge 318 overlying the edge of the adjustable bar 310 so that this clamping plate also forms a guide for the bar during its vertical adjustment.

The clamping plate is secured as by bolts 320 threaded into the bracket arm 312. This mounting bracket is also formed with a mounting ring or collar 322 extending perpendicular to the depending bracket arm 312. The mounting ring 322 of the bracket is secured to the lower edge of the tubular section 34 of the drill press head frame 16 as by mounting bolts 324. It is essential that mounting ring or collar 322 extend at right angles to the axis of the spindle 40 and therefore in some instances it may be necessary or desirable to grind the lower edge of the tubular section 34 of the drill press head frame 16 so as to square that edge with the spindle axis and thereby assure squareness of the mounting ring with the spindle axis.

The screw carrier guide and control sleeve 306 is formed with an enlarged and knurled head portion 326. A portion of the head 326 is cut away to provide an axially extending slot or recess 328 and a chordal groove or recess 330 communicating with the axial slot and forming a latching lug 332 having a cam nose 334 at its forward end and a concave latching recess 336 to the rear of the cam nose.

The mounting bar 310 is formed at its lower end with a mounting and retaining finger 338 for the control sleeve 306. The retaining finger 338 is spaced from the subjacent body of the bar 310 by a slot 340 of a width sufficient to receive the latching lug 332 of the control sleeve.

A resilient latch 342 comprises a piece of spring wire having a U-shaped latching end 344 extending on opposite sides of the bar 310 and passing through the slot 340 to engage the latching lug 332. The spring wire is also formed in a resilient loop 346 which is anchored to the bar 310 as by inserting the end of the wire into a suitable hole in the bar so that the resilient loop portion of the wire urges the U-shaped latching portion 344 into engagement with the latching lug 332 of the control sleeve. It will be evident that if, when the control sleeve is inserted in the boss 308, it is rotated to align the axial slot 328 with the retaining finger 338, the head 326 of the sleeve may be moved into the plane of the finger with the latching lug 332 lying in the plane of the slot 340 and the finger 338 lying in the plane of the chordal groove 330. Thereafter on turning of the sleeve in a clockwise direction, as seen in Figs. 11 and 12, the camming nose 334 of the latching lug 332 will engage the latching loop 344 of the latching spring and move it rearwardly until the camming nose has passed the latching loop and the latching loop then springs into the latching recess 336 for resiliently and detachably securing the control sleeve to the bar 310.

Figures 8, 9, 10, 11, 12:
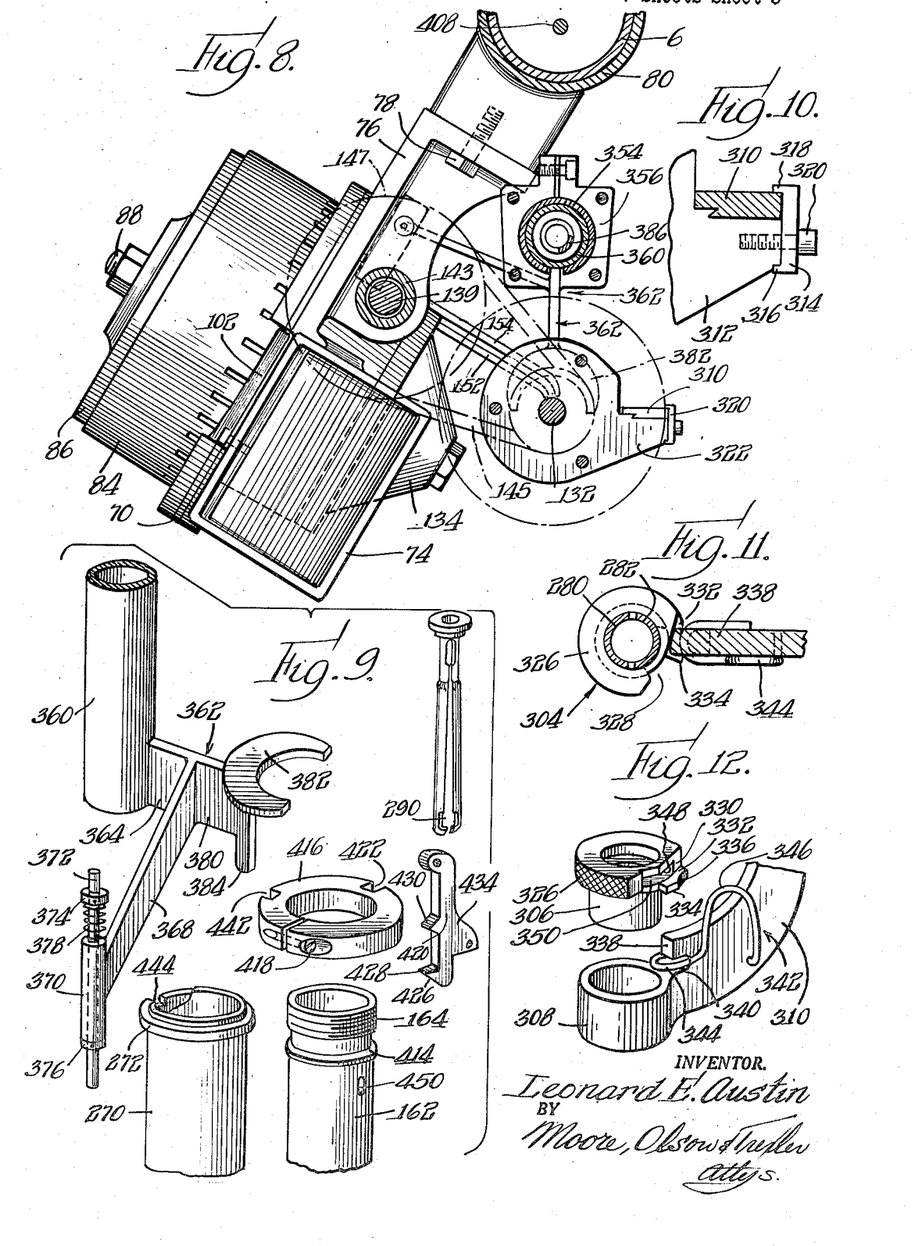
Fig. 8 is an enlarged view in horizontal section taken substantially along the line 8—8 of Fig. 2.
Fig. 9 is an exploded view in perspective of some of the elements of the mechanism.
Fig. 10 is an enlarged view in horizontal section taken substantially along the line 10—10 of Fig. 3.
Fig. 11 is a fragmentary view in horizontal section taken substantially along the line 11—11 of Fig. 19.
Fig. 12 is an exploded view in perspective of the parts shown in Fig. 11.

If a screw becomes jammed in the carrier or catcher, or for any reason becomes cocked with respect to the threaded opening in the work piece so it cannot be inserted by the bit screw driver blade, the operator may instantaneously release the screw simply by rotating the control sleeve 306 in a counter-clockwise direction, as seen in Fig. 11, to release the latching lug from the retaining finger 338 of the latching spring 342 and align the axial slot 328 with the retaining finger and thereupon lift the control sleeve to allow the carrier or catcher arms to move to open position, as will presently appear.

The internal surface of the control sleeve is concentric with the spindle axis and is of a diameter such that when the annular beveled surface 298 of the cam portion 296 of the catcher arms engages the inner wall of the sleeve at the upper edge thereof, the catcher arms will be automatically moved to closed position due to the downward movement of the catcher arms through the sleeve. It will be evident that as the cam portion 296 passes below the lower end of the control sleeve, the annular tapered surface 300 passes the lower edge of the sleeve, the catcher arms will move to open position to such an extent as is permitted by the engagement of the reduced sections 302 of the catcher arms with the internal surface of the control sleeve.

The head 326 of the sleeve may be provided with an internal annular groove 348 opening into the chordal groove 330 and the axial slot 328 so as to permit insertion in the annular groove of a lubricant retaining and lubricating washer or ring 350. This ring serves by lubricating the external surface of the catcher and thereby the internal surface of the sleeve to reduce the friction between the catcher arms and the sleeve.

In order to reduce the friction, and in place of the lubricating ring 350, the control bushing may be provided with a bore of differing diameter, as shown in Fig. 25. Thus, the lower portion 352 of the bore of the control sleeve 306' for an axial length of approximately one-eighth inch, may be made smaller than the remaining upper portion 354 of the bore, so that it is only the portion 352 of limited axial length which engages the surfaces of the catcher arms. This modified control sleeve 306' also permits greater accuracy in the stroke adjustment for the screw carrier, as will hereinafter appear.

*The quill actuator and reciprocating drive connections*

The quill actuator 64 and reciprocating drive connections 66 comprise a fluid actuator or pneumatic motor including a cylinder 354, Figs. 1 and 2, received in a vertical hole drilled through the drill press frame 16 and mounted on the frame by a split mounting bracket 356, Fig. 2, clamped to the cylinder and bolted to the lower end of the frame 16.

A piston 358 is press fitted or otherwise secured in any convenient manner to a long tube 360 open at its bottom end, the upper end of the tube being closed by piston 358. The tube 360 at its lower end is secured to or formed integrally with a bracket 362, best seen in Fig. 9, the bracket having an arm 364 which extends from the cylinder 354 through a slot 366, Fig. 2, in the lower portion of the cylinder. The arm 364 is formed integrally with a diagonally depending arm 368, Figs. 3, 4 and 9, formed at its lower end with a boss 370 in which is slidably mounted an escapement control rod 372. The escapement control rod 372 is provided with a pair of adjustable collars 374 and 376 secured in adjusted position by appropriate set screws. A coil spring 378 is interposed between the upper end of the boss 370 and the collar 374.

It will be evident that the adjustable collar 376 determines the distance of projection of the control rod above the boss, while the adjustable collar 374 controls the extent of downward movement of the rod relative to the bracket 362. The bracket 362 is also formed with an arm 380 provided at its outer end with a semi-circular yoke 382 and depending guide bar or lug 384 which serves to guide the screw carrier sleeve 270, as will presently appear.

The fluid motor also includes a return actuating coil spring 386, Fig. 2, housed in the tube 360 and positioned at its lower end by a rod 388 which projects thereinto, the rod 388 having a tapered seating projection 390 seated in a tapered hole in a cap member 392 which is secured, in any convenient manner, to the lower end of the cylinder and closes the lower end thereof.

The upward movement of the piston 358 under the action of the return actuating spring 386 is determined by a cylinder head nut 394 threaded into the upper end of the cylinder and carrying a conventional air admitting and exhausting control valve structure 396, the valve structure having an air exhaust opening 398 and an air pressure supply pipe 400. The control valve 402 is normally urged to air exhausting position in which the air exhausting passage 398 is connected to the air passage 404 in the cylinder head nut 394. The piston 358 is provided with a cushion piston 406 in the form of a rod projecting above the main piston and received in a complementary small opening in the cylinder head nut 394, the small piston 406 serving to cushion the final upward movement of the main piston so that in its upper position it abuts the cylinder head, as shown in Fig. 2. Leakage of air past the piston 358 may be prevented by a single packing ring 405 set into a groove in the piston.

The control valve 402 may be operated to air admitting position connecting the air pressure supply pipe 400 to the air passage 404 by a lever 407 pivoted to the valve head 390 at one end and at its upper end to a control rod 408 extending through the hollow column 6 of the drill press. At its lower end the control rod 408 is connected to a lever 410 pivoted to the base 4 intermediate its ends, the lever passing into the column through an appropriate slot at the base of the column and carrying at its forward end a foot pedal or treadle 412 by means of which the lever may be swung in a counterclockwise direction, as seen in Fig. 1, to raise the control rod 408 and thereby swing the valve control lever 407 in a counterclockwise direction and the control valve 402 to fluid admitting position. On release of the pedal 412 the weight of the control rod 408 causes return of the foot pedal to its upper position and moves the valve control lever 406 in a clockwise direction, thereby permitting the control valve 402 to move to air exhaust position connecting the air exhaust passage 398 to the air passage 404. The spring 386 thereupon moves the piston 358 and the tube 360 and consequently the bracket 362 to their upper positions.

The yoke 382 of the bracket 362 encircles the sleeve 162 of the screw driver unit 58, as best seen in Figs. 2 and 19 to 23, the sleeve being provided adjacent its upper end in spaced relation to the threaded portion 164 with an annular, seating flange 414 for the yoke 382, the yoke being clamped between that flange and the bottom of the quill 40 when the sleeve 162 is threaded into the lower end of the quill. On return movement of the fluid motor, under the action of the spring 386, the escapement actuating rod 372 engages the operating bar or lever 124 of the escapement control device 52 and swings the lever and the escapement control disk in a clockwise direction from the position shown in Fig. 14 so that the screw blank seated in the notch 130 or 132 of the escapement disk is released for movement down the lower part of the chute 110 and along the chute 56 to the screw carrier or catcher.

The tube or housing sleeve 162 of the screw driving unit, the quill and the spindle are directly connected to the fluid motor, as hereinbefore described, but the screw receiving or carrying means is operatively connected to the actuator only during a portion of the reciprocating movements of the screw driving unit, the quill and the spindle. The reciprocating and drive connections 66 by means of which the screw carrying means is thus caused to reciprocate with the screw driving unit only during a portion of its travel comprises a split clamping ring 416 clamped in adjusted position on the housing tube 162 of the screw driving unit as by clamping bolt 418. A clutch member or latch 420 is received in a slot 422, Fig. 9, in the clamping ring 416, and is pivoted thereto as by a chordal pin 424, Fig. 19, the member or latch depending from the clamping ring.

The latch 420 is formed at its lower end with a cam surface 426 forming also a latching projection providing a latching shoulder 428. Intermediate of its length on the same side as the latching projection, the member 420 is formed with a generally V-shaped camming projection 430 having upper and lower camming surfaces. The latch member is also formed on its opposite side with a control cam lug 434 adapted to ride upon a control track 436 formed integrally with the mounting bar 310 for the catcher control means 304. The control track 436 terminates at its lower end in a camming portion 438, which by engagement with the camming edge of the cam lug 434 causes inward movement of the latch member on upward movement of the screw driving unit and allows outward movement of the latch member during a downward movement of the screw driving unit.

It should be noted that the annular flange 272 formed on the upper end of the screw carrier tube 270 is tapered as at 440 to form a cam surface cooperating with the under camming surface of the cam projection 430 to cause the latch member to swing in a counterclockwise direction when the camming lug 434 on downward movement of the parts reaches the cut-out portion of the control track, provided by the camming surface 438.

It should further be noted that the under surface of the annular flange 272 is substantially normal to the surface of the screw carrier tube 270 so as to form a sharp shoulder providing a keeper for engagement by the sharp shoulder 428 of the latching projection of the latch member 420.

The clamping ring 416 is provided with a slot 442 and the annular flange 272 of the screw carrier tube 270 is provided with a similar slot 444 so as to receive the depending bar portion 384 of the fluid motor bracket 362. This bracket, which is guided in a precisely vertical plane by the slot 366 in the fluid motor cylinder (see Fig. 2) maintains the screw carrier tube 270 and the clamping ring 416 against rotation and maintains the latch member 420 in the plane of the control track 436.

*Operation*

A mass of screws is dumped into the hopper funnel 74 and passes therefrom through the open bottom of the funnel into the constantly rotating screw tumbler drum 84. Screws which in the course of being tumbled become aligned with their heads against the outer surface of the main hopper casting 70, Fig. 13, and with their shanks extending parallel to the axis of the drum and aligned with one of the slots 69 may pass therethrough during the time when the slot is moving in the arc extending from a horizontal plane through the axis of the drum to the upper edge of the block 112, see Fig. 14. The screws thus pass through the tumbler drum into the arcuate chute section 106 and then gravitate into the upper end of the vertical feed chute 110 where the shank of the foremost screw is received in a notch 130 or 132 of the escapement disk 120 and the line of screws in the chute above that escapement is thereby supported against further downward movement. The tumbler continues to agitate the screws, particularly those screws in the arcuate section 106 of the feed chute, and the agitation of these serves to transmit agitating forces to the screws in the section of the vertical chute 110 above the escapement disk.

When the control disk 120 is oscillated in a clockwise direction, as seen in Fig. 14, it releases the screw within the notch of the disk for gravitation down the remaining portion of the vertical chute 110 and down the bars 152 of the chute 56. The screw gravitating down the last chute passes directly between the parts of the partially closed catcher arms 280 and 282, as illustrated in Fig. 7. The screw driving unit and the catcher at this time are in the upward limit of movement, as shown in said figure, and the bit blade of the screw driver is spaced sufficiently above the lower end of the catcher arms to permit the head of the screw to pass freely through the slots 290 into the catcher arms and rest on the inwardly extending lips 292 of the catcher arms. At this time the latching shoulder 428 of the clutch member or latch 420 is in engagement with the under surface of the annular flange 272 of the carrier tube 270 and the clutch members 184 and 216 of the rotary and drive unit 60 are disengaged from each other, as shown in Figure 19. The operator presses the pedal 412 thereby raising the control rod 408 to swing the valve lever 406 in a counter-clockwise direction, as seen in Fig. 2, thereby moving the fluid control valve 402 to fluid admitting position and the admission of pressure fluid to the fluid motor causes downward movement of the piston and thereby of the tube 360 and the bracket 326. This causes the quill 40 and the housing tube 162 of the screw driving unit to move downwardly. In view of the fact that the cam lug 430 of the clutch member or latch 420 is spaced from the shoulder 272 of the carrier tube 270 this downward movement of the screw driving unit is not transmitted to the screw carrier. This downward movement of the screw driving unit relative to the screw carrier continues until the bit blade of the screw driver having engaged the head of the screw the bit 246 is thereby held against further downward movement, the spring 222 is compressed and the clutch member 184 has been brought into engagement with the clutch member 216. During this relative movement between the clutch members 184 and 216, the compressing of the spring 222 and the friction between the stub shaft and the spindle portion 220 of the tool receiving chuck starts the rotation of the screw driver so that the screw driver begins to turn at a slow rate with considerable slippage between the tool receiving chuck and the rotary drive unit so that the screw driver generally locates the slot in the screw before the screw driver is positively driven by the engagement of the clutch members 184 and 216. The spring 222 having been compressed and the clutch members 184 and 216 having been brought into engagement the continued downward movement of the screw driver unit causes the downward movement of the screw carrier, the downward force being transmitted to the screw carrier through the head of the screw clamped between the end of the screw driver and the inwardly extending lips 292 of the screw catcher, and by engagement of the cam lug 430 against the shoulder 272.

It will be noted that, as shown in Fig. 20, the cam lug 430 starts out positioned somewhat above the annular shoulder 272 of the screw carrier tube 270, but soon moves into contact therewith positively to lower the screw carrier. As the screw driving unit and the screw carrier continue to move downwardly in unison, the cam portion 296 of the screw catcher arms reaches and passes into the control bushing or sleeve 306 which thereupon forces the screw catcher arms into closed position, thereby centralizing and holding the screw properly aligned for entrance into the threaded aperture 446 of the work piece 448. If the screw head is oversized so that the catcher arms when closed grip the screw with such force as to prevent rotation thereof, the clutch spring 196 may yield, allowing the clutch members 178 and 184 to move to disengaged position by reason of the camming formation of their interengaging teeth.

Figures 22, 23:
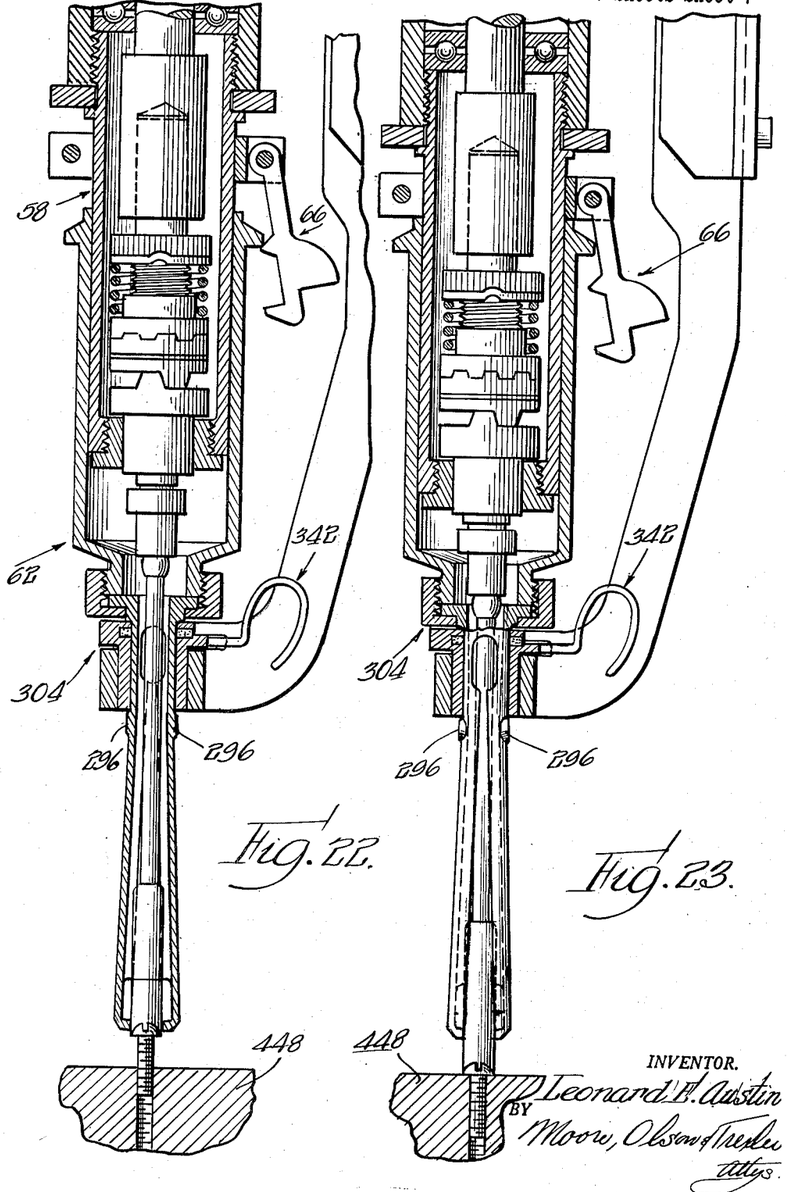

Normally, however, the screw driver continues to be rotated and to rotate the screw as it enters the work aperture, as shown in Fig. 21, and the screw driving unit and the screw carrier continue to move down while the screw is threaded into the work until the cam portions 296 of the catcher arms pass the bottom of the control sleeve 306 and the reduced sections 302 of the catcher arms lie within the bushing. The catcher arms thereupon instantly spring to open position, as shown in Fig. 22.

At the time that the cam portions 296 pass below the control bushing the latch member 420 reaches the position shown in Fig. 22 and the lower cam surface of the cam lug 430 of the latch member interengaging with the tapered upper surface 440 of the annular shoulder 272 of the screw carrier tube 270 causes the latch member to move outwardly, releasing the screw carrier from the downwardly moving housing tube 162 of the screw driving unit. The screw carrier now rests upon the control bushing 306 but the screw driving unit continues to descend while the screw driver rotates and moves through the open screw catcher arms, as shown in Fig. 23, thereby driving the screw to its final position, as shown in Fig. 23.

The operator thereupon releases the foot pedal 412, allowing the control valve 402 to return to its normal position, as previously described, thereby connecting the air passage 404 to the exhaust passage 398. The spring 386 of the fluid motor thereupon moves the piston in an upward direction and raises the drill press quill and spindle and the screw driving unit. The screw driving unit moves upwardly relative to the screw carrier until the cam lug 434 of the clutch member or latch 420 engaging the cam surface 438 at the lower end of the control track 436 swings the latch in a clockwise direction and causes the latching projection to engage the shoulder 272 of the screw carrier tube 270, after which the screw carrier or catcher moves upwardly with the screw driving unit. It will be evident of course that during this upward movement of the screw driving unit relative to the screw carrier, the screw driver bit 246 will be withdrawn into the catcher arms to the position shown in Fig. 19 and thereafter as the screw driver unit and the screw carrier move upwardly to their original position the catcher arms will be returned to the position shown in Fig. 1 when they are in partially open position and aligned with the bottom end of the feed chute 56 to receive the next screw therefrom.

As the screw driving unit and screw carrier approach this upper position, the escapement control rod 372 engages the escapement control lever or bar 124 and again swings the escapement control disk in a clockwise direction, as seen in Fig. 14, to release the next screw for downward movement into the catcher arms of the screw carrier.

As previously indicated, various adjustments are provided for accommodating different types and sizes of screws. The stroke of the screw carrier or catcher may be adjusted to accommodate different size screws by sliding the bar 310 upwardly and downwardly relative to the depending arm 320 of the mounting ring 322. This adjustment of the control bar governs the extent to which the screw carrier may move downwardly bringing the reduced section 302 into the control bushing, at which time the catcher arms are opened and the screw carrier disconnected from the screw driving unit by the permitted outward swinging of the latch member 420. Adjustment of the timing of the operation of the escapement for different stroke adjustments of the screw carrier may readily be accomplished by adjustably positioning the collars 374 and 376 on the escapement control rod 372.

The attachment of different size screw driver bits as required for different sizes and types of screws within a certain range may be accomplished by substituting bit blades 258 by simple interchange of bit blades attached to the bit 246. Interchanging of sets of catcher arms to accommodate different sizes or range of sizes of screws may readily be accomplished by removing the nut 288 and the bar 310 after which the catcher is removed from the bar and a new catcher inserted and then the bar and catcher reassembled with the screw carrier and the depending arm 312 of the mounting ring 322.

Interchange of screw driver bits 246 to accommodate different ranges or sizes of screws may readily be accomplished simply by removing bar 310, thereby allowing the screw carrier tube to be pulled off the end of the tube 162 and the screw driver bit is then pulled out of the screw driving unit by a downward pull, the retaining ball springing out of the annular groove 254, when such a pull is exerted on the driver bit. The substitute driver bit is then snapped into place and the screw carrier tube replaced on the tube 162 and the bar 310 adjusted to its proper stroke determining position.

Adjustment of the hopper drum and the retaining sector 104 relative to the hopper casting 70 in order to accommodate screws of different head thicknesses may readily be accomplished as has previously been described, and similarly the chute bars 152 and 154 may be adjusted relative to each other to accommodate screws of different shank diameters. The slot 96 in the hopper drum may be of sufficient size to handle a wide range of screws of different shank diameter, and the retaining sector 104 with its chute block 108 and the chute block 112 may be readily replaced by similar parts of different transverse width to provide screw chutes 106 and 110 of different widths to accommodate screws of different sizes of shank diameter.

The torque at which the clutch member 198 may move out of engagement with the clutch member 194 may be readily adjusted by inserting a pin-like tool through an opening 450 in the housing tube 162 of the screw driving unit, the pin being insertable in a radial opening in the adjusting ring nut 206 so as to hold that ring nut against rotation while the drill press spindle is manually turned in one direction or the other so that the adjusting nut moves axially relative to the threads of the stub shaft 166.

It should be noted that the cam lug 430 on the clutch member or latch 420 provides means for preventing the screw driver from being brought by downward relative movement of the screw driver unit into engagement with the screw receiving lips or shelves or ledges 292 of the screw catcher arms. If the screw driver were to engage these catcher arms 292 because of the failure of the screw feeding means to deliver a screw to the catcher, and the clutch member 216 was thereafter brought into engagement with the clutch member 184, the rotation of the screw driver might cause breakage either of the bit blade or the catcher arms. The latch member 420 is therefore mounted on the housing tube 162 of the screw driving unit, by adjustment of the mounting ring 416, along the tube so that the cam lug 430 will engage the upper beveled edge 440 of the annular flange 272 of the screw carrier tube 270 before the screw driver has been moved downwardly sufficiently to bring the bit blade into engagement with the screw receiving ledges 292 of the catcher arms. Therefore if by exhaustion of the screw supply or by reason of the failure of the screw feeding means, a screw is not delivered to the catcher, the cam lug will prevent the screw driver from engaging the catcher.

It should further be noted that as the screw approaches the work and the catcher arms are brought to closed position, as previously described, the screw is positively held in the catcher arms and will not be released therefrom on contact with the work if it is not properly aligned with the work aperture. In prior screw drivers with which applicant is familiar the screw carriers or clamps, simply being spring urged to hold the screw as it is brought to the work, frequently release the screw and the screw being driven by the screw driver, is released from the screw carrier and mars and defaces the work. However, in the present structure, the screw being positively held in the catcher will not be released therefrom and cannot mar the surface of the work if the screw becomes cross fitted with respect to the work aperture before the catcher has reached the open position. In such an event, the operator may rotate the control bushing 306 and lift it out of the boss 304 and raise it along the shanks of the catcher arms until it reaches the reduced section 302 of the catcher arms and the catcher arms are thereupon snapped to open position and disengage the screw from the catcher.

If the screw becomes jammed in the escapement mechanism, the spring 378 will permit the escapement control rod 372 to yield relative to the bracket 362 so that no damage will be done to the escapement mechanism or the fluid motor, and the operator may quickly release the jammed screw from the escapement simply by pushing the operating knob 118 of the pin 116, thereby moving the chute block 112 out of the plane of the escapement, thereby enabling the operator to disengage the jammed screw from the escapement.

It will be seen from the foregoing description that applicant has provided a power screw driver, and particularly a hopper fed power screw driver, which will avoid the difficulties and overcome the insufficiencies of prior power screw drivers; a power screw driver, and more particularly a hopper fed power screw driver, embodying or utilizing a standard drill press; a screw feeding unit including a hopper and screw feeding control means, and a rotary and reciprocating screw driver unit of such construction as to be attachable to a standard drill press to convert such standard drill press into a hopper fed power screw driver; in a power screw driver positively acting holding means receiving and carrying screws to threaded work pieces or nuts with which they are to be assembled; readily operable means for ejecting screws jammed in a screw feeding means or in a screw driver mechanism of a power screw driver; in a power screw driver readily operable means for adjusting the driving mechanism for the handling of different sizes of screws; in a power screw driver readily interchangeable screw receiving and driving parts to facilitate setting up of the power screw driver to handle the different sizes and shapes of screws; in a power screw driver, of the type utilizing a driver blade engaging the slots in the heads of the screws, driving means impositively rotating the driver blade during the slot finding movement of the blade relative to the screw so as not to mar the screw head, and positively rotating the screw as it is brought into engagement with the threaded aperture in the work piece or nut with which the screw is to be assembled; in a power screw driver improved fluid actuating means, preferably pneumatic, for rectilinearly reciprocating the screw driving mechanism between a screw receiving position and a screw driving position; in a power screw driver improved screw carrier means comprising a one-piece resilient catcher normally self-urged to screw releasing position and controlled by the means by which it is guided and through which it moves so that the catcher assumes, in its different positions of movement, a partially closed position for receiving a screw, a fully closed position in which it aligns and centralizes the screw with the threaded work aperture and an open position in which it releases the screw; in a power screw driver having an axially shiftable and rotatable screw driver and an axially shiftable screw receiver or catcher, the combination of power actuated means for axially shifting the screw driver through a predetermined, readily adjustable length of travel, and means for automatically connecting and disconnecting said power actuated means to said screw receiver or catcher for axially shifting said receiver or catcher during a predetermined adjustable portion only of the axial movement of the screw driver; in a power screw driver having an axially shiftable and rotatable screw driver and an axially shiftable screw receiver or catcher cooperating therewith, the combination of power actuated means for rotating the screw driver, means for shifting the screw driver and screw receiver axially, and means forming an impositive or frictional rotary drive connection between the power actuated means and the screw driver as the screw driver first engages the work piece and responsive to the engagement of the screw by the screw driver to form a positive driving connection between the power actuated means and the screw driver.

It will be obvious that changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. In a power screw driver, a support, a rotary and rectilinearly shiftable screw driver unit mounted on said support, a screw carrier shiftably mounted on said screw driver unit for movement therewith on engagement of a screw in the carrier by the screw driver unit, screw feeding means including a hopper mounted on said support, a screw feeding chute mounted on and depending from said hopper and positioned to deliver screws at its lower end to the carrier, an escapement mechanism releasing one screw at a time for movement down the chute to the carrier, an actuator for shifting said screw driver unit rectilinearly, said actuator including means for operating said escapement mechanism to release a screw for movement down the chute as the screw driver unit approaches one limit of its rectilinear movement, said screw carrier including screw receiving jaw members movable to open and closed position, means controlled by the movement of the carrier for moving said jaw members to open position as the screw driver unit and the carrier approach the other limit of movement of the screw driver whereby to release the screw from the carrier for driving by the screw driving unit, and manually operable means for opening the jaw members of the screw carrier at will to release a screw therefrom.

2. In a power screw driver, a first rectilinearly shiftable hollow member, a rotary screw driver bit carried by and depending from said member, a rotary drive spindle rotatably mounted in said member and secured to said member for rectilinear movement therewith, rotary drive means connecting said spindle to said screw driver bit, a screw carrier including a second hollow member slidably mounted on the first hollow member and having depending jaw members spaced apart and movable between a closed position receiving a screw therebetween, and an open position releasing the screw for driving by said screw driver bit, said driver bit projecting into the space between said jaw members, actuator means for shifting said first hollow member to move the driver bit into engagement with the screw in the jaw members of the carrier, positive means for shifting the jaw members with the first hollow member and the driver bit, means limiting shifting of said jaw members with said driver bit, and control means causing the jaw members to move to a closed position to receive and hold a screw when the hollow members are in a first limit of movement and causing the jaw members to move to open position as the members approach a second limit of movement whereby to release the screw for rotation by the rotary screw driver bit.

3. In a power screw driver as set forth in claim 2, wherein the jaw members are resiliently urged to open position and the control means comprises a guide for the jaw members maintaining them in closed position positively to hold the screw in said jaw members, said guide and said jaw members being shaped to permit said jaw members to move to open position as the members approach said second limit of movement.

4. In a power screw driver as set forth in claim 2, wherein the rotary screw driver bit is mounted for shifting relative to the first hollow member and the rotary drive means connecting the spindle to the screw driver bit, relatively shiftable clutch members movable into engagement in response to the engagement of the screw by the screw driver bit, and means for connecting the screw carrier to the first hollow member in the absence of a screw in the carrier to prevent engagement of said clutch members and rotation of the screw driver bit in the absence of a screw in the carrier.

5. In a power screw driver as set forth in claim 2, wherein the actuator means returns the first hollow member from its second limit of movement to its first limit of movement, and the power screw driver includes automatically operable means for connecting the second hollow member to the first hollow member during its return movement to return the screw carrier to screw receiving position.

6. In a power screw driver, a pair of telescoping relatively slidable sleeves, a screw driver bit journalled in the inner sleeve and projecting therefrom beyond the outer sleeve, a screw catcher carried by the outer sleeve and enclosing and projecting beyond the screw driver bit, said catcher having a pair of relatively shiftable jaws receiving a screw therebetween below said driver bit, a rotatably and axially shiftable spindle mounted in the first sleeve and operatively connected to the screw driver bit to rotate the same and to the first sleeve for axial shifting in unison therewith, actuator means for shifting said sleeves and said spindle axially between a first position in which a screw is received in said catcher jaws and a second position for driving of the screw in a work piece, the jaws in said second position being spaced from said work piece a predetermined distance, means or delivering screws individually to said catcher jaws when said sleeves are in the first position, and control means causing the jaw members to move to a closed screw receiving position when the sleeves are in the first position and moved to open position as the sleeves approach the second position.

7. In a power screw driver as set forth in claim 6, wherein the jaws are resiliently interconnected and normally urged to open position and the control means comprises a guide for the jaws maintaining them closed when the sleeves are in the first position and during their movement from the first position to the second position and permitting opening of the jaws as the sleeves approach the second position.

8. In a power screw driver as set forth in claim 6, wherein the catcher jaws comprise a sleeve having opposite slots extending part way longitudinally of the sleeve to form the jaws and resiliently urge the jaws to open position and the sleeve has portions of different external diameter and wherein the control means comprises a sleeve slidably receiving the catcher sleeve portions and cooperating with the catcher sleeve portions of different diameter to maintain the jaws in closed position when the telescoping sleeves are in the first position and during the shifting of the sleeves to the second position and permitting opening of the catcher jaws as the telescoping sleeves approach second position.

9. Power screw driver attachments for a drill press having a rotary and axially shiftable spindle and a quill shiftable axially with the spindle and in which the spindle is journalled for rotation, said attachments comprising a sleeve adapted to be threaded into the quill, a screw driver bit journalled in said sleeve and operatively connectable to said spindle for rotation thereby, a second sleeve slidably mounted on the first sleeve and having a depending hollow catcher in which the screw driver bit extends, said catcher having relatively shiftable jaws movable from a closed position receiving a screw to an open position releasing the screw for driving into a work piece by the screw driver bit, means attachable to the drill press for controlling the opening and closing of the catcher jaws, a screw feeding means including a hopper attachable to the drill press, and power actuated means attachable to the drill press for shifting said quill and spindle, said sleeves, said screw driver bit and said catcher axially.

10. Power screw driver attachments as set forth in claim 9, wherein the connections between the spindle and the screw driver bit include a first clutch for disconnecting the driver bit from the spindle at a predetermined driving torque and a second clutch automatically operable to disconnect the screw driver bit from the spindle when not engaged with a screw in the catcher jaws.

11. Power screw driver attachments for a drill press as set forth in claim 9, wherein the power actuated means comprises a pneumatic motor having a piston air actuated in one direction and spring actuated in the opposite direction.

12. A screw carrier comprising a sleeve having diametrically opposite slots extending from one end thereof partially the length of the sleeve, the opposed arms formed by the slots having inwardly bent end portions forming shelves to support the head of a screw in the catcher, said arms having confronting recesses communicating with one of the slots and adjacent said shelves to permit the feeding of a screw transversely of the axis of the sleeve onto said shelves, and said arms being resilient and normally set away from one another.

13. In a screw carrier as set forth in claim 12, wherein the sleeve is of varying external diameter for cooperation with a guide sleeve of predetermined diameter to control the opening and closing movements of the jaws formed by the opposed slots in the sleeve.

14. In a power screw driver, a drill press having a vertical supporting column, a work table adjustable vertically on said column, a drill press head unit adjustably mounted on said column, a hopper unit adjustably mounted on said column, a screw driving unit and a screw carrying unit secured to said drill press head, a screw feeding unit carried by the hopper unit and positioned to deliver screws to the screw carrying unit, means for shifting said screw carrying unit between a screw receiving position and a screw discharging position a predetermined distance above said work table, and means for discharging screws from said carrying unit at said screw discharging position.

15. In a power screw driver as set forth in claim 14, a fluid actuator mounted on the drill press head and operatively connected to the screw driving unit and the screw carrier to reciprocate same toward and from a work table.

16. In a power screw driver as set forth in claim 15, wherein the screw feeding hopper unit includes an escapement mechanism causing one screw at a time to be fed into the chute, and means operated by the fluid actuator for operating said escapement mechanism to release a screw to the chute in predetermined timed relation to the screw driver unit and the screw carrying unit.

17. Fastener handling attachments for a fastener driving apparatus having an axially shiftable driving member and a mounting member axially shiftable therewith, said attachments comprising a sleeve adapted to be secured to said mounting member, a fastener driving tool mounted in said sleeve and operatively connectible to said driving member, a second sleeve slidably mounted on the first sleeve and having a depending hollow catcher in which the fastener driving tool extends, said catcher having relatively shiftable jaws movable from a closed position receiving a fastener to an open position releasing the fastener for driving into a work piece by the fastener driving tool, means attachable to the fastener driving apparatus for controlling the opening and closing of the catcher jaws, fastener feeding means including a hopper attachable to the fastener driving apparatus, and power actuated means attachable to the fastener driving apparatus for shifting said mounting member and said driving member, said sleeves, said fastener driving tool, and said catcher axially.

18. In a power screw driver, a first rectilinearly shiftable hollow member, a rotary screw driver bit carried by and depending from said member, a rotary drive spindle rotatably mounted in said member and secured to said member for rectilinear movement therewith, rotary drive means connecting said spindle to said screw driver bit, a screw carrier including a second hollow member slidably mounted on the first hollow member and having depending jaw members spaced apart and movable between a closed position receiving a screw therebetween, and an open position releasing the screw for driving by said screw driver bit, said driver bit projecting into the space between sad jaw members, actuator means for shifting said first hollow member to move the bit into engagement with a screw in the jaw members of the carrier, means on said first hollow member effective substantially upon engagement of said bit with said screw to shift said second hollow member and said depending jaw members in unison with said first hollow member, and means for rendering the shifting means on said first hollow member ineffective to shift said second hollow member and said depending jaw members as said first hollow member continues to shift.

19. In a power screw driver, a supporting column, a hopper mounted on said column, drive means mounted on said column, said drive means including a rotary and rectilinearly shiftable drive member and a rectilinearly shifting mounting member, a screw carrier shiftably mounted on said mounting member for movement therewith and relative thereto, said carrier including resilient jaw members normally set away from one another and movable to open and closed position to receive and release a screw, means for delivering screws individually from the hopper to the jaw members of the carrier, a screw driver unit secured to said mounting member for movement therewith and connected to said drive member for rotation thereby and positioned to engage a screw in the jaw members of said carrier, actuator means for rectilinearly shifting said mounting member, a sleeve for maintaining said jaw members in closed position, a drive member on said mounting member, driven means on said screw carrier engageable with said drive member substantially concurrently with engagement of a screw carried in said jaw members by said screw driver unit, means maintaining said drive member in engagement with said driven member to shift said carrier to bring said screw into engagement with an apertured work piece, means for disengaging said driving means from said driven means to stop said carrier with said jaws short of said work piece while continuing to shift said mounting member and said screw driver unit, and means for relatively shifting said jaws and said sleeve axially to effect separation of said jaws to release said screw.

20. Fastener driving apparatus comprising a fastener driver member operable between a retracted and an advanced position, means for supporting a fastener in alignment with said driver member and spaced therefrom with said driver member in retracted position, means for supplying fasteners to said fastener supporting means, means for advancing said driver member relative to said supporting means to bring said driver member into engagement with a fastener carried by said supporting means, means for thereafter positively advancing said driver member and said supporting means as a unit, means for arresting said supporting means, means operable independently of said fastener to release said fastener from said supporting means with said supporting means in said arrested position, and means for further advancing said driver member beyond said supporting means to drive said fastener into a work piece.

21. Fastener driving apparatus as set forth in claim 20 wherein the fastener supporting means comprises a plurality of resilient jaws and the means for releasing a fastener therefrom comprises means for controlling flexing of the jaws.

22. Fastener driving apparatus as set forth in claim 21 where the resilient jaws are resiliently urged to fastener releasing position, and the means for controlling flexing thereof comprises a guide normally holding said jaws in fastener supporting position and slidable relative to said jaws to effect movement of said jaws to fastener releasing position.

LEONARD E. AUSTIN.

References Cited in the file of this patent

UNITED STATES PATENTS

| Number | Name | Date |
|---|---|---|
| 1,638,261 | Henricson | Aug. 9, 1927 |
| 1,813,697 | Dellaree | July 7, 1931 |
| 2,260,055 | Reardon | Oct. 21, 1941 |
| 2,314,760 | Blair | Mar. 23, 1943 |
| 2,328,383 | Lea et al. | Aug. 31, 1943 |
| 2,373,992 | Billinghurst | Apr. 17, 1945 |
| 2,554,732 | Doyle | May 29, 1951 |